(12) United States Patent
Bjerrum et al.

(10) Patent No.: US 11,213,034 B2
(45) Date of Patent: Jan. 4, 2022

(54) METHOD AND DEVICE FOR CUTTING DOUGH OUTPUT BY AN EXTRUSION MACHINE

(71) Applicant: Haas Food Equipment GmbH, Vienna (AT)

(72) Inventors: Per Bjerrum, Frederiksberg (DK); Stefan Jiraschek, Koenigsbrunn (AT)

(73) Assignee: Haas Food Equipment GmbH, Vienna (AT)

( * ) Notice: Subject to any disclaimer, the term of this patent is extended or adjusted under 35 U.S.C. 154(b) by 468 days.

(21) Appl. No.: 15/999,282

(22) PCT Filed: Feb. 15, 2017

(86) PCT No.: PCT/EP2017/053348
§ 371 (c)(1),
(2) Date: Aug. 17, 2018

(87) PCT Pub. No.: WO2017/140703
PCT Pub. Date: Aug. 24, 2017

(65) Prior Publication Data
US 2019/0045801 A1 Feb. 14, 2019

(30) Foreign Application Priority Data

Feb. 17, 2016 (EP) ..................... 16156044

(51) Int. Cl.
*A21C 11/10* (2006.01)
*A21C 11/16* (2006.01)
*B29C 48/00* (2019.01)

(52) U.S. Cl.
CPC .............. *A21C 11/10* (2013.01); *A21C 11/16* (2013.01); *B29C 48/0022* (2019.02)

(58) Field of Classification Search
CPC ........... A21C 11/10; A21C 11/16; B26D 1/04; B26D 1/045; B26D 1/06; B26D 1/065;
(Continued)

(56) References Cited

U.S. PATENT DOCUMENTS 719,413 A * 2/1903 Anderson ............... B29B 9/065
425/311
1,151,465 A * 8/1915 Humphreys .......... B29C 31/048
425/311
(Continued)

FOREIGN PATENT DOCUMENTS

EA 004017 B1 12/2003
EP 0 230 368 A2 7/1987
(Continued)

OTHER PUBLICATIONS

International Search Report of PCT/EP2017/053348, dated Apr. 18, 2017.

*Primary Examiner* — Joseph S Del Sole
*Assistant Examiner* — Manley L Cummins, IV
(74) *Attorney, Agent, or Firm* — Collard & Roe, P.C.

(57) ABSTRACT

The invention relates to a cutting device (101 . . . 106) for a dough extrusion machine (2), comprising a moveable frame (3), a wire (41) or a blade (42) mounted on said frame (3), and a first drive (51, 52) coupled to said frame (3) causing a movement of the frame (3) in a first direction (x). Moreover, the cutting device (101 . . . 106) comprises a second drive (61, 62, 62') coupled to said frame (3), which causes a movement of the frame (3) in a second direction (z) transverse to the first direction (x). The second drive (61, 62, 62') can be actuated independently of said first drive (51, 52). In addition, the invention relates to a method of cutting dough by means of said cutting device (101 . . . 106), wherein the first drive (51, 52) and the second drive (61, 62,
(Continued)

Figure 1:
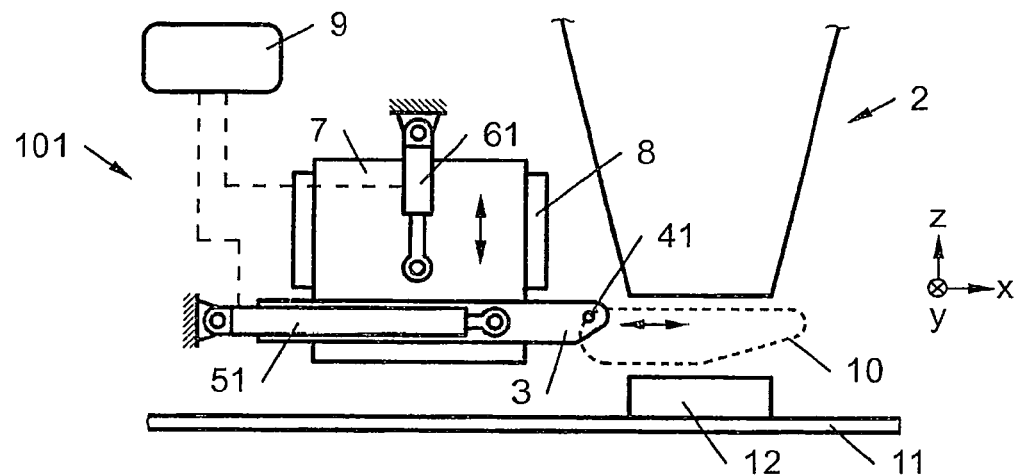

62') are simultaneously actuated during movement of the wire (41)/blade (42).

19 Claims, 4 Drawing Sheets

(58) Field of Classification Search
CPC . B26D 1/08; B26D 1/085; B26D 1/09; B26D 1/095; B26D 1/10; B26D 1/105; B26D 1/11; B26D 1/115; B26D 1/45; B26D 1/455; B26D 1/547; B26D 1/5475; B26D 2001/004; B26D 2001/008; B26D 2001/0086; B26D 2007/0043; B26D 2007/005; B26D 2007/2685; B26D 3/162; B26D 3/20; B26D 3/225; B26D 7/0658; B26D 7/0666; B26D 7/0683; B29C 48/0022
See application file for complete search history.

(56) References Cited

U.S. PATENT DOCUMENTS

| | | | | |
|---|---|---|---|---|
| 1,571,121 A | * | 1/1926 | Humphreys | A21C 15/04 425/311 |
| 2,488,046 A | | 11/1949 | Werner et al. | |
| 3,152,560 A | * | 10/1964 | Fries | A21C 11/166 426/440 |
| 3,530,491 A | * | 9/1970 | Rejsa | A21C 11/16 425/142 |
| 3,708,253 A | * | 1/1973 | Lemelson | B29C 53/30 425/155 |
| 3,782,876 A | * | 1/1974 | Groff | A23G 3/0247 425/232 |
| 4,436,013 A | | 3/1984 | Gerber | |
| 4,442,131 A | * | 4/1984 | Nagy | A21C 5/00 425/287 |
| 4,734,024 A | * | 3/1988 | Tashiro | A21C 11/00 425/132 |
| 4,737,092 A | * | 4/1988 | Bullick | A21C 11/16 425/142 |
| 4,843,536 A | | 6/1989 | Watanabe | |
| 5,289,764 A | * | 3/1994 | Morikawa | A21C 5/00 425/142 |
| 6,123,972 A | * | 9/2000 | Matthews | A22C 7/00 30/114 |
| 7,207,264 B2 | | 4/2007 | Sakurazawa | |
| 7,351,189 B2 | | 4/2008 | Stäb | |
| 2003/0101876 A1 | * | 6/2003 | Sakurazawa | A23L 7/109 99/353 |
| 2005/0160889 A1 | * | 7/2005 | Stab | B65H 45/28 83/13 |
| 2018/0153178 A1 | * | 6/2018 | Tokuhara | B26D 7/08 |

FOREIGN PATENT DOCUMENTS

| | | |
|---|---|---|
| EP | 0 601 194 A1 | 6/1994 |
| JP | 2002-144382 A | 5/2002 |
| RU | 2 283 269 C2 | 9/2006 |

* cited by examiner

METHOD AND DEVICE FOR CUTTING DOUGH OUTPUT BY AN EXTRUSION MACHINE

CROSS REFERENCE TO RELATED APPLICATIONS

This application is the National Stage of PCT/EP2017/053348 filed on Feb. 15, 2017, which claims priority under 35 U.S.C. § 119 of European Application No. 16156044.6 filed on Feb. 17, 2016, the disclosure of which is incorporated by reference. The international application under PCT article 21(2) was published in English.

The invention relates to a cutting device for a dough extrusion machine, comprising a moveable frame, a wire or a blade mounted on said frame, and a first drive coupled to said frame causing a movement of the frame in a first direction. In addition, the invention relates to a method of cutting dough extruded by a dough extrusion machine, the cutting being performed by means of a cutting device as defined before, wherein said wire/blade is cyclically moved along a moving path forming a closed curve during cutting.

Such a cutting device and such a cutting method are generally known in prior art.

U.S. Pat. No. 2,488,046 in this context discloses a dough cutting machine, which periodically cuts cookie dough or the like being pressed out of nozzles. The cookies fall down on a belt and are continuously transported to a baking oven. A frame, on which a cutting wire is mounted, is driven by a single motor and moves along a moving path forming a closed curve. The moving path is basically defined during design of the cutting device and cannot be changed easily afterwards.

Furthermore, EP 0 230 368 A2 discloses a machine to form a spherical body comprising a dough crust and a filling. A plurality of cutting members, which open and close like an iris, are used for that reason. A vertical movement can be superimposed on the cutting movement.

Finally, EP 0 601 194 A1 discloses yet another machine with a plurality of cutting members, which open and close like an iris, and with the possibility to superimpose a vertical movement on the cutting movement.

Besides of complicated mechanical adjustments and modifications, the cookie extruder has to be stopped before changing the moving path and has to be started afterwards. As a consequence, it is hard to impossible to immediately value the effects of the adjustments and modifications. Particularly, starting and stopping the extruder causes transient effects on the dough extrusion, thus blurring the effects of the adjustments and modifications. Consequently, finding an optimal moving path is foiled or at least very cumbersome.

Accordingly, it is an object of the invention to provide an improved cutting device and an improved cutting method. In particular, the cutting device shall allow for easy modification of the moving path of the wire/blade.

The problem of the invention is solved by a cutting device as defined in the opening paragraph, comprising a second drive coupled to said frame, which causes a movement of the frame in a second direction transverse to the first direction and which can be actuated independently of said first drive.

Furthermore, the problem of the invention is solved by a method using a cutting device of the kind above, wherein the first drive and the second drive are simultaneously actuated during movement of the wire/blade.

In particular, a single wire or a single blade is used to cut dough. In this way, the wire/blade can be kept clean easily.

Advantageously, the shape of the moving path can freely be determined by changing the drive signals for the first and the second drive. No mechanical adjustment and no mechanical modification of the cutting device is needed. Accordingly, changing the shape of the moving path is not just easy but also possible during movement of the wire/blade.

In this way the cutting process can be optimized during the production of cookies and the effects of changing the moving path get visible immediately. Stopping and starting the extruder, which is necessary in prior art solutions and which causes transient effects thus foiling an optimal adjustment of the moving path, can be avoided.

In a preferred embodiment, the moving path of the wire/blade is a closed curve. This allows for a preferred continuous movement (without stops) of the wire/blade. In this way, high speeds of the wire/blade can be achieved with just moderate accelerations.

In a beneficial embodiment of the invention, the cutting device comprises a control being connected to said first and second drive and being designed to calculate drive signals for the same based on a given moving path for the wire/blade. For example, the moving path may be shown on a (touch)screen, where the operator can change it by simple drag-and-drop operations.

It should be noted that the invention not just relates to cutting dough, but also to cutting other pastry materials in the food industry, like pastry chocolate or caramel and the like.

Further advantageous embodiments are disclosed in the claims and in the description as well as in the Figures.

Beneficially, the first direction and the second direction are essentially perpendicular to each other. In this way, generating a moving path for the wire/blade based on the superposition of two sub-movements is comparably easy. This advantage particularly counts if the first drive causes an essentially horizontal movement of the frame and the second drive causes an essentially vertical movement of the frame. "Essentially" means up to +/−10° in the context above.

In yet another beneficial embodiment of the invention, the cutting device comprises a third drive coupled to said wire or blade, which causes a movement of the wire/blade in a third direction transverse to the first direction and transverse to the second direction, particularly substantially perpendicular to the first direction and substantially perpendicular to the second direction. Accordingly, the cutting of the dough is improved by the shearing movement of the wire/blade during its forward movement.

In an advantageous embodiment of the invention, the first drive is a first linear motor and/or the second drive is a second linear motor and/or the third drive is a third linear motor. In this way, linear movements of the cutting wire/blade can be achieved easily. Linear motors may be embodied as hydraulic cylinders, pneumatic cylinders or (electric) spindle motors for example.

In an alternative advantageous embodiment of the invention, the first drive is a first rotational motor and/or the second drive is a second rotational motor and/or the third drive is a third rotational motor. Rotational motors are easily accessible and robust. Rotational motors may be embodied as hydraulic motors, pneumatic motors or electric motors for example. Rotational drives generally can move continuously in one direction with constant angular speed or with varying speed during one turn being controlled by the control. However, the rotational drives may also move back and forth to generate the movement of the wire/blade. In particular, the eccentricity of the connection points for the crank rods may be very high compared to the moving length of the wire/blade in this case.

In yet another advantageous embodiment, the frame is mounted on a carriage by means of a first linear rail or guide oriented in said first direction and said carriage is mounted on a base by means of a second linear rail or guide oriented in said second direction or vice versa. In this way a serial manipulator is provided, which are proven means for generating a moving path for the wire/blade based on the superposition of two sub-movements.

Beneficially, the frame is connected to said first drive by means of a first rod and to said second drive by means of a second rod. By these measures, rotational motors as well as linear motors may be connected to the frame.

In this context, advantageously the first end of the first rod is pivotably mounted to said frame and a second end of the first rod is pivotably mounted to an eccentric point of a first turnable disc or lever, which is rotatable by the first drive. In this way, the movement of a rotational motor can be transformed into a linear movement of the frame or a movement along an arbitrary curve. Also the movement of a linear motor may be transformed into a movement of the frame along an arbitrary curve. Depending on the eccentricity of the connection points for the rods, just a small angular movement of a turnable disc can cause a comparably large movement of the blade/wire. Accordingly, the blade/wire may move with high speed. Generally, the moving speed of the wire/blade can range from 0.2 m/s to 0.7 m/s and its acceleration up to 65 m/s$^2$.

In yet another advantageous embodiment the frame is connected to said second drive by means of two parallel second rods, wherein first ends of the second rods are pivotably mounted to said frame at first connecting points located on the frame at a distance, wherein second ends of the second rods are pivotably mounted to eccentric points of second turnable discs or levers at second connecting points, wherein the first and the second connecting points form corners of a virtual parallelogram and wherein said second turnable discs or levers are synchronously rotatable by the second drive. Accordingly, the orientation of the frame may easily be kept during movement or at least may be defined by the position of the second turnable discs or levers. Linear guidings may be avoided, and mechanical wear can be reduced in this way.

Above advantages particularly count if the second discs/levers are connected by means of a third rod pivotably mounted to eccentric points of the second discs/levers at identical radiuses. In this way, the frame keeps its orientation in space during synchronous movement of the second turnable discs or levers.

Generally, the second turnable discs or levers may independently be driven by independent motors, synchronously be driven by independent motors or may be coupled by a gear, a belt or a rod and driven by a single motor.

Furthermore, the frame may be part of a serial manipulator or a parallel manipulator as defined hereinbefore.

It is noted at this point that the embodiments of the cutting device for a dough extrusion machine and the associated advantages presented herein equally relate to the method of cutting dough extruded by a dough extrusion machine and vice versa.

Figure 2:
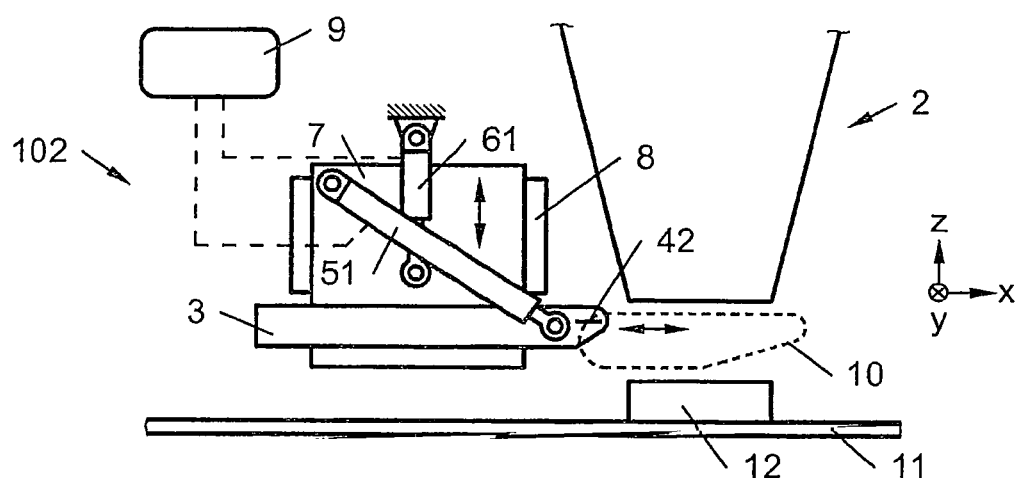
Figure 3:
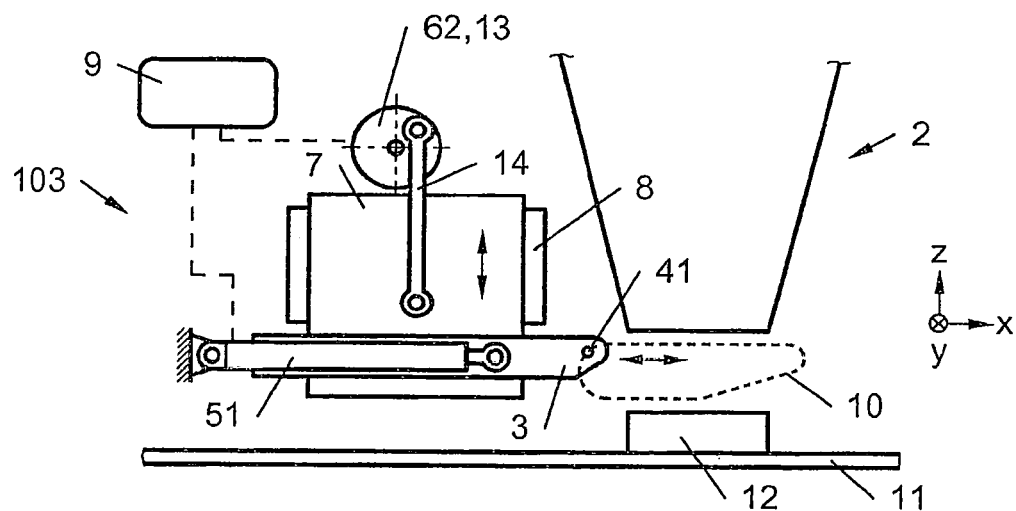
Figure 4:
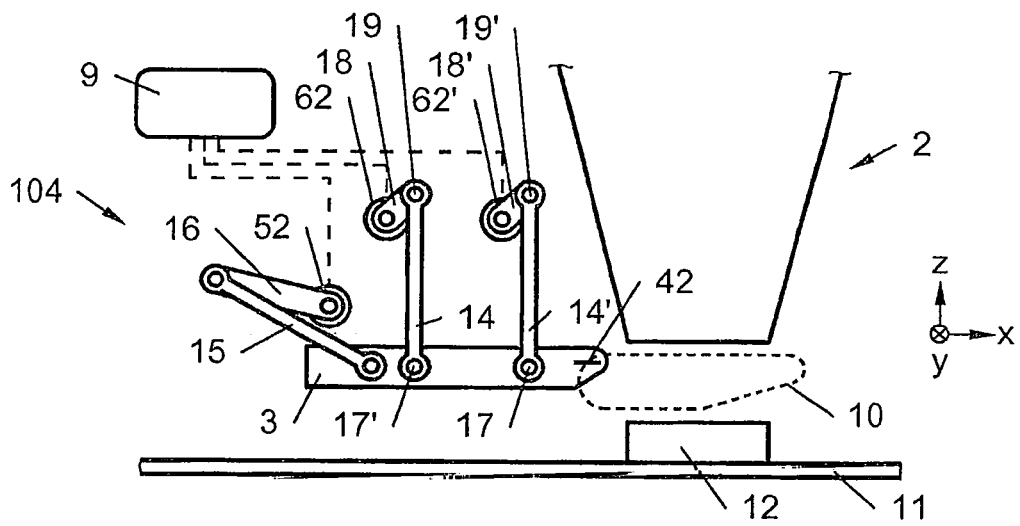
Figure 5:
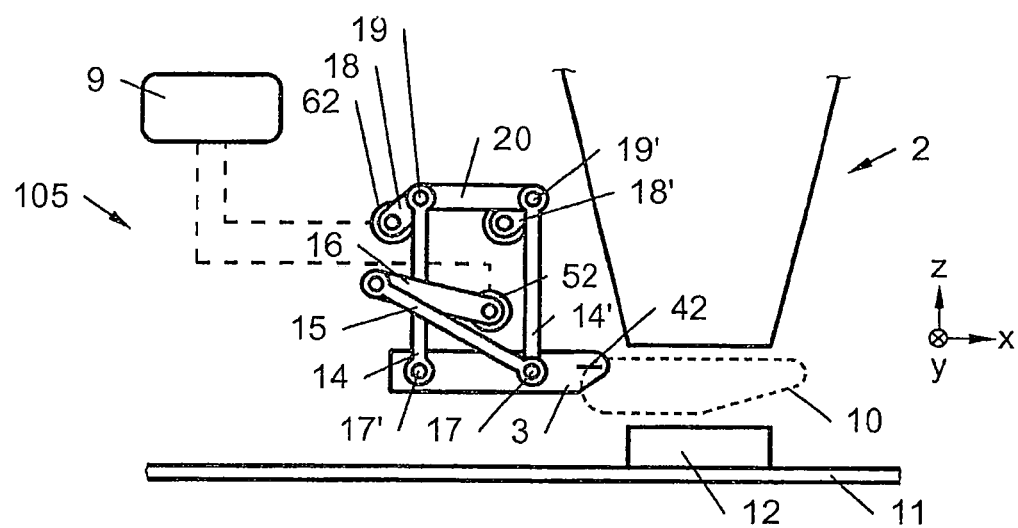
Figure 6:
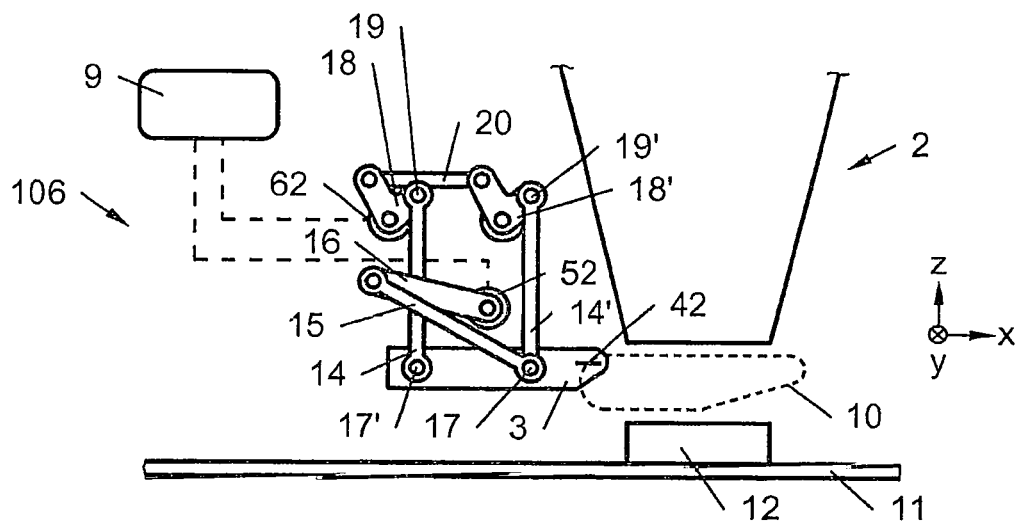
Figure 7:
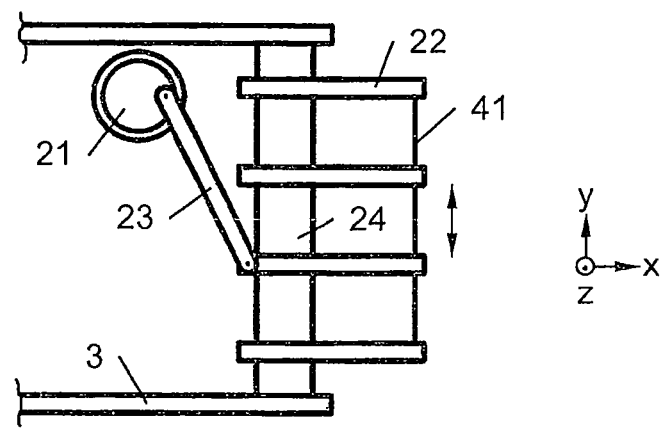

For better understanding the invention Figures showing embodiments of the invention are presented hereinafter. The Figures schematically show:

FIG. 1 a schematic side view of a first example of a cutting device for a dough extrusion machine with linear drives and a parallel manipulator for the frame;

FIG. 2 a schematic side view of a second example of a cutting device for a dough extrusion machine with linear drives and a serial manipulator for the frame;

FIG. 3 a variant similar to FIG. 1, but with a rotational second drive;

FIG. 4 a schematic side view of another example of a cutting device for a dough extrusion machine with rotational drives and a parallel manipulator for the frame;

FIG. 5 a variant similar to FIG. 4, but with a single second drive;

FIG. 6 a variant similar to FIG. 5, but with differently shaped second levers and FIG. 7 a schematic top view of an arrangement providing an oscillating movement of the cutting wire in a third direction.

Generally, the same parts or similar parts are denoted with the same/similar names and reference signs. The features disclosed in the description apply to parts with the same/similar names respectively reference signs. Indicating the orientation and relative position (up, down, sideward, etc.) is related to the associated Figure, and indication of the orientation and/or relative position has to be amended in different Figures accordingly as the case may be.

FIG. 1 shows a schematic side view of a first example of a cutting device 101 for a dough extrusion machine 2. The cutting device 101 comprises a moveable frame 3, a wire 41 mounted on said frame 3, and a first drive 51 coupled to said frame 3 causing a movement of the frame 3 in a first direction x. Moreover, the cutting device 101 comprises a second drive 61 coupled to said frame 3, which causes a movement of the frame 3 in a second direction z transverse to the first direction x. The second drive 61 can be actuated independently of said first drive 51.

In this example the frame 3 is mounted on a carriage 7 by means of a first linear rail or guide oriented in the first direction x, and said carriage 7 is mounted on a base 8 by means of a second linear rail or guide oriented in said second direction z. Thus, the carriage 7 can move in vertical direction z and the frame 3 can move in horizontal direction x and in vertical direction z. However, in an alternative embodiment the carriage 7 may move in horizontal direction x while the frame 3 moves in vertical direction z and horizontal direction x. While the arrangement offers a number of features of a serial manipulator, strictly speaking it comprises a parallel manipulator as the horizontal movement of the frame 3 is not fully independent of the vertical position of the carriage 7.

In the example above, the first direction x and the second direction z are essentially perpendicular to each other and the first drive 51 causes a horizontal movement of the frame 3 and the second drive 61 causes a vertical movement of the frame 3. Although this is advantageous, this is not a necessary condition. The first direction x and the second direction y may also form a different angle and may also be slanted with respect to the horizontal and vertical direction.

In this example, both drives 51 and 61 are embodied as linear motors, for example as hydraulic cylinders, pneumatic cylinders or spindle motors. Furthermore, the drives 51 and 61 are directly connected to the frame 3 respectively to the carriage 7. However, said drives 51 and 61 may also be connected to the frame 3 respectively to the carriage 7 by means of connecting rods.

Finally, the cutting device 101 comprises a control 9 being connected to the first drive 51 and the second drive 61. The control 9 is designed to calculate drive signals for the drives 51 and 61 based on a given moving path 10 for the wire 41.

In addition to the entities cited before, a pan, tray or band 11 with a cookie 12 on top is shown. It should also be noted that in FIG. 1 just a nozzle of the dough extrusion machine 2 is shown for the reason of simplicity. However, in reality a dough extrusion machine 2 comprises additional means such as a hopper and feeding rolls for example. The dough extrusion machine 2 as well as the band 11 are in principle known from prior art and thus are not explained in detail.

The function of the arrangement shown in FIG. 1 is as follows:

Dough is feed through the nozzle and cut by the wire 41 during a horizontal movement of the same. After the cutting step, the wire 41 is moved downwards and retracted in its starting position. Accordingly, the wire 41 cyclically moves along the moving path 10, which forms a closed curve. Both drives 51 and 61 are actuated simultaneously during said movement. Advantageously, the shape of the moving path 10 can freely be determined. In a particularly advantageous embodiment the shape of the moving path 10 is changed during movement of the wire 41.

In this way the cutting process can be optimized during the production of cookies 12 and the effects of changing the moving path 10 get visible immediately. Stopping and starting the extruder 2, which itself causes transient effects and foils an optimal adjustment of the moving path 10, can be avoided.

Beneficially, the control 9 calculates drive signals for the drives 51 and 61 based on a moving path 10 given by the operator. For example, the moving path 10 may be shown on a (touch)screen, where the operator can change it by simple drag-and-drop operations.

In the example shown in FIG. 1 the cutting device 101 comprises a parallel manipulator as stated before. However, this is not the only possible solution. FIG. 2 shows another example of a cutting device 102 with a serial manipulator. For this reason, the left end of the first drive 51 is mounted on the carriage 7. In this example, first drive 51 is mounted in slanted position. However, the first drive 51 may also be mounted in horizontal position. Advantageously, in this embodiment a vertical movement of the carriage 7 does not influence a horizontal movement of the frame 3, thus allowing for a rather simple control 9. It should also be noted, that in the embodiment of FIG. 2 a blade 42 is used instead of a wire 41.

FIG. 3 shows another variant of a cutting device 103, which is similar to the cutting device 101 shown in FIG. 1. In contrast, cutting device 103 does not comprise a second linear drive 61 but a second drive 62, which is embodied as a rotational motor and which turns a disc 13 with an eccentric pin. A rod 14 connects the pin of the disc 13 with the carriage 7, thus transforming a rotational movement of the second drive 62 into a linear movement of the carriage 7. In FIG. 3, the first drive 51 is still a linear drive. However, instead also a rotational motor with a disc and a rod may be used.

FIG. 4 shows an embodiment of a cutting device 104 with different kinematics. Concretely, the cutting device 104 comprises a first drive 52 and two second drives 62, 62' being embodied as rotational motors. The frame 3 is connected to said first drive 52 by means of a first rod 15 and to said second drives 62, 62' by means of second rods 14, 14'. The first end of the first rod 15 is pivotably mounted to the frame 3, and a second end of the first rod 15 is pivotably mounted to an eccentric point of a first turnable lever 16, which is rotatable by the first drive 52.

The first ends of the second rods 14, 14' are pivotably mounted to the frame 3 at first connecting points 17, 17' located on the frame 3 at a distance, and the second ends of the second rods 14, 14' are pivotably mounted to eccentric points of second turnable levers 18, 18' at second connecting points 19, 19'. The left second rod 14 is parallel to the right second rod 14' and the first connecting points 17, 17' and the second connecting points 19, 19' form corners of a virtual parallelogram. In the particular position shown in FIG. 4, the points 17, 17' and 19, 19' even form the corners of a virtual rectangle. In this example, the cutting device 104 comprises a parallel manipulator.

The function of the arrangement shown in FIG. 4 is as follows:

The control 9 generates drive signals for the first drive 52 and the second drives 62, 62' according to a given moving path 10. The second levers 18, 18' are rotated synchronously by the second drives 62, 62'. That is why the frame keeps its (horizontal) orientation during movement. Second drives 62, 62' mainly effect a vertical movement of the frame 3 and a just a minor horizontal movement. To perform a substantial horizontal movement, mainly the first drive 52 is actuated, and the second drives 62, 62' just perform a compensation movement.

In the example above, the eccentricity of the pins on the second levers 18, 18' is the same, so that the points 17, 17' and 19, 19' form the corners of a virtual parallelogram at any time. Although this is an advantageous embodiment, the eccentricity of said pins may also be different. Tilting of the frame 3 caused thereby may be compensated by the first drive 52. Advantageously, a wire 41 may be used instead of a blade 42 for such an embodiment.

In this example, the cutting device 104 comprises two second drives 62, 62' for turning the second levers 18, 18'. Nevertheless, a single second drive 62 may be used in connection with second levers 18, 18' coupled by a gear, a belt or a chain thus caring for synchronous movement of the second levers 18, 18'. Alternatively, the second levers 18, 18' may be connected by means of a third rod, which is pivotably mounted to eccentric points of the second levers 18, 18', particularly at identical radiuses. FIGS. 5 and 6 show examples for such arrangements.

In the embodiment of FIG. 5, which is similar to the embodiment shown in FIG. 4, the second levers 18, 18' are connected by means of a third rod 20. Accordingly, a gear, a belt or a chain to couple the levers 18, 18' may be omitted, and just a single second drive 62 is needed. The third rod 20 in FIG. 5 uses the same pins as the second rods 14, 14'.

Furthermore, the first drive 52, the first lever 16 and the first rod 15 have been shifted to the right in view of the cutting device 104, thus making the cutting device 105 more compact. In this example, the first rod 15 uses the same pivot joint as the second rod 14'. However, the first rod 15 may be mounted to the frame 3 also at another location.

FIG. 6 shows another embodiment of a cutting device 106, which is quite similar to the cutting device 105 of FIG. 5. In contrast, the third rod 20 is mounted to the second levers 18, 18' on different pins than the second rods 14, 14'. Second levers 18, 18' are L-shaped for this reason. However, it is also possible to use different levers for second rods 14, 14' and the third rod 20.

In FIGS. 5 and 6 the third rod 20 is pivotably mounted to the second levers 18, 18' at identical radiuses. This is favorable but not mandatory. It is also possible to mount the third rod 20 to the second levers 18, 18' at different radiuses, thus causing different rotation angles of the second levers 18, 18'. The same can also be achieved by means of a gear, a belt or a chain. In case of cutting device 104, second drives 62, 62' may be actuated differently.

It should be noted that in all examples the wire 41 may be replaced by a blade 42 and vice versa. Moreover, in all examples a disc 13 may be replaced by a lever 16, 18, 18' and vice versa. Generally, in all examples a linear drive 51, 61 may be used instead of a rotational drive 52, 62, 62' and vice versa. Especially in the context of the examples shown in FIGS. 4 to 6 one should also note that the particular position, orientation and length of the levers 16, 18, 18' and rods 14, 14', 15, 20 shown in the Figures is just schematically and exemplary. The behavior of the arrangement may be changed by changing the position, orientation and/or length of the levers 16, 18, 18' and rods 14, 14', 15, 20. Nevertheless the position and orientation of the frame 3 may be kept. For example, the second levers 18, 18' may be oriented downwards, and the second rods 14, 14' may be made shorter.

Generally, high speeds and accelerations of the wire 41/blade 42 can be achieved by using rotational drives 21, 52, 62, 62' (see FIGS. 3 to 7). Depending on the eccentricity of the connection points 19, 19' a comparably small angular movement of the rotational drives 21, 52, 62, 62' can cause a comparably large movement of the wire 41/blade 42. Accordingly, the wire 41/blade 42 may move with high speed. The moving speed of the wire 41/blade 42 particularly ranges from 0.2 m/s to 0.7 m/s, its acceleration up to 65 m/s$^2$.

Generally, it is of advantage if the moving path 10 of the wire 41/blade 42 is a closed curve. This allows for a preferred continuous movement (without stops) of the wire 41/blade 42. In this way, high speeds can be achieved with just moderate accelerations.

When the frame 3 has two connection points 17, 17' like this is shown in FIGS. 4 to 6, linear guidings may be avoided. In this way, mechanical wear and thus the risk of contamination of the cookies 12 by grit can be reduced.

FIG. 7 now shows a partial top view of an embodiment with a third drive 21 coupled to said wire 41 and causing a movement of the wire 41 in a third direction y transverse to the first direction x and transverse to the second direction z. Particularly the third direction y is perpendicular to the first direction x and perpendicular to the second direction z here what is beneficial but not mandatory. Concretely, the third drive 21 is coupled to beams 22 by means of a fourth rod 23. The beams 22 are linked together and movably mounted on a bar 24. A rotation of the third drive 21 causes an oscillating movement of the wire 41 in the third direction y. In FIG. 7 a rotational motor 21 is shown. However, also a linear motor can be used instead. The arrangement shown in FIG. 7 may be used in connection with any cutting device 101 . . . 106. The motor 21 may also be connected to the control 9, which then can generate driving signals for a three-dimensional moving path 10 of the wire 41/blade 42. However, the motor 21 may simply be turned on and off as desired so that the movement of the wire 41/blade 42 in y-direction is not synchronized with the movements of the wire 41/blade 42 in x-direction and z-direction.

Rotational drives 21, 52, 62, 62' generally can move continuously in one direction with constant angular speed or with varying speed during one turn what is controlled by the control 9. However, the rotational drives 21, 52, 62, 62' may also move back and forth to generate the movement of the wire 41/blade 42. In particular, the eccentricity of the connection points 19, 19' may be very high compared to the moving length of the wire 41/blade 42 in this case.

It is noted that the invention is not limited to the embodiments disclosed hereinbefore, but combinations of the different variants are possible. In reality, the cutting device 101 . . . 106 may have more or less parts than shown in the Figures. The cutting device 101 . . . 106 and parts thereof may also be shown in different scales and may be bigger or smaller than depicted. Finally, the description may comprise subject matter of further independent inventions.

LIST OF REFERENCE NUMERALS

101 . . . 106 cutting device
2 dough extrusion machine
3 frame
41 wire
42 blade
51, 52 first drive
61, 62, 62' second drive
7 carriage
8 base
9 control
10 moving path of wire/blade
11 pan/tray/band
12 cookie
13 disc
14, 14' second rods
15 first rod
16 first turnable lever
17, 17' first connecting points
18, 18' second turnable levers
19, 19' second connecting points
20 third rod
21 third drive
22 beam
23 fourth rod
24 bar
x first direction
y third direction
z second direction

The invention claimed is:
1. A cutting device for a dough extrusion machine, the cutting device comprising:
 a moveable frame,
 a wire or a blade mounted on the moveable frame,
 a first drive coupled to the moveable frame causing a movement of the moveable frame in a first direction,
  a second drive coupled to the moveable frame, which causes a movement of the moveable frame in a second direction transverse to the first direction and which can be actuated independently of the first drive, and
  a control connected to the first drive and the second drive and being designed to calculate drive signals for the first drive and the second drive based on a given moving path for the wire or the blade,
  wherein the wire or the blade is cyclically moved along a moving path forming a closed curve during cutting.
2. The cutting device according to claim 1, wherein the first direction and the second direction are essentially perpendicular to each other.
3. The cutting device according to claim 2, wherein the first drive causes an essentially horizontal movement of the moveable frame and the second drive causes an essentially vertical movement of the moveable frame.
4. The cutting device according to claim 1, further comprising a third drive coupled to the wire or the blade and causing a movement of the wire or the blade in a third direction transverse to the first direction and transverse to the second direction.

5. The cutting device according to claim 4, wherein at least one of the first drive, the second drive, and the third drive is a linear motor.

6. The cutting device according to claim 4, wherein at least one of the first drive, the second drive, and the third drive is a rotational motor.

7. The cutting device according to claim 1, wherein the moveable frame is mounted on a carriage by means of a first linear rail or guide oriented in the first direction and the carriage is mounted on a base by means of a second linear rail or guide oriented in the second direction or wherein the moveable frame is mounted on the carriage by means of the second linear rail or guide oriented in the second direction and the carriage is mounted on the base by means of a first linear rail or guide oriented in the first direction.

8. The cutting device according to claim 1, wherein the movable frame is connected to the first drive by means of a first rod and to the second drive by means of a second rod.

9. The cutting device according to claim 8, wherein a first end of the first rod is pivotably mounted to the movable frame and a second end of the first rod is pivotably mounted to an eccentric point of a first turnable disc or lever, which is rotatable by the first drive.

10. The cutting device according to claim 9 wherein the moveable frame is connected to the second drive by means of two parallel second rods, wherein first ends of the second rods are pivotably mounted to the moveable frame at first connecting points located on the moveable frame at a distance, wherein second ends of the second rods are pivotably mounted to eccentric points of second turnable discs or levers at second connecting points.

11. The cutting device according to claim 10, wherein the first connecting points and the second connecting points form corners of a virtual parallelogram and the second turnable discs or levers are synchronously rotatable by the second drive.

12. The cutting device according to claim 11, wherein the second turnable discs or levers are connected by means of a third rod pivotably mounted to eccentric points of the second turnable discs or levers at identical radiuses.

13. The cutting device according to claim 1, wherein the wire or the blade comprises a single wire or a single blade mounted on the moveable frame.

14. A cutting device for a dough extrusion machine, the cutting device comprising:
    a moveable frame,
    a wire or a blade mounted on the moveable frame,
    a first drive coupled to the moveable frame causing a movement of the moveable frame in a first direction,
    a second drive coupled to the moveable frame, which causes a movement of the moveable frame in a second direction transverse to the first direction and which can be actuated independently of the first drive, and
    a third drive coupled to the wire or the blade and causing a movement of the wire or the blade in a third direction transverse to the first direction and transverse to the second direction.

15. A method of cutting dough extruded by a dough extrusion machine, the method comprising the steps of:
    providing a cutting device, the cutting device comprising a moveable frame (3), a wire or a blade mounted on the moveable frame, a first drive coupled to the moveable frame, a second drive coupled to the moveable frame which can be actuated independently of the said first drive, and a control connected to the first drive and the second drive and being designed to calculate drive signals for the first drive and the second drive based on a given moving path for the wire or the blade;
    simultaneously actuating the first drive and the second drive;
    causing a movement of the moveable frame in a first direction with the first drive;
    causing a movement of the moveable frame in a second direction transverse to the first direction with the second drive; and
    cyclically moving the wire or the blade along the moving path forming a closed curve during cutting.

16. The method according to claim 15, wherein the moving path is changed during movement of the wire or the blade.

17. The method according to claim 15, wherein the wire or the blade continuously moves along the moving path.

18. The method according to claim 15, wherein a movement of the wire or the blade is caused by rotational motors which move back and forth.

19. The method according to claim 15, further comprising at least one of the steps of moving the wire or the blade at a speed in a range of 0.2 m/s to 0.7 m/s and accelerating the wire or the blade at a rate of up to 65 m/s$^2$.

* * * * *